United States Patent [19]

Bodnar et al.

[11] 3,754,480

[45] Aug. 28, 1973

[54] VEHICLE CONTROL APPARATUS

[75] Inventors: Alfred D. Bodnar, Pontiac; Edward J. Rudaitis, Warren, both of Mich.

[73] Assignee: General Motors Corporation, Detroit, Mich.

[22] Filed: May 8, 1972

[21] Appl. No.: 251,399

[52] U.S. Cl. .................................... 74/512, 74/560
[51] Int. Cl. ............................................ G05g 1/14
[58] Field of Search ....................... 74/512, 519, 560

[56] References Cited
UNITED STATES PATENTS
3,643,524   2/1972   Herring ............................ 74/560 X Primary Examiner—Milton Kaufman
Assistant Examiner—Frank H. McKenzie, Jr.
Attorney—Warren E. Finken et al.

[57] ABSTRACT

Adjustable control apparatus particularly adapted for control of automobile operating systems normally actuated by the foot of the vehicle operator, the apparatus including a pair of pivot bars supported on the vehicle body for pivotal movement about a common fixed axis, a pair of pedal support members slidably mounted on respective ones of the pivot bars, pedals rigidly connected to each of the pedal support members and defining pressure application surfaces oriented to direct forces applied thereto along lines extending obliquely to the pivot bars so that bodily shiftable movement of the pedal support members alters the lever arms of the applied forces about the fixed axis, an adjusting member supported on the vehicle body for selective bodily shiftable movement and motion transmitting cable assemblies between the adjusting member and the pedal support member adapted to effect movement of the latter synchronously with movement of the former.

3 Claims, 7 Drawing Figures

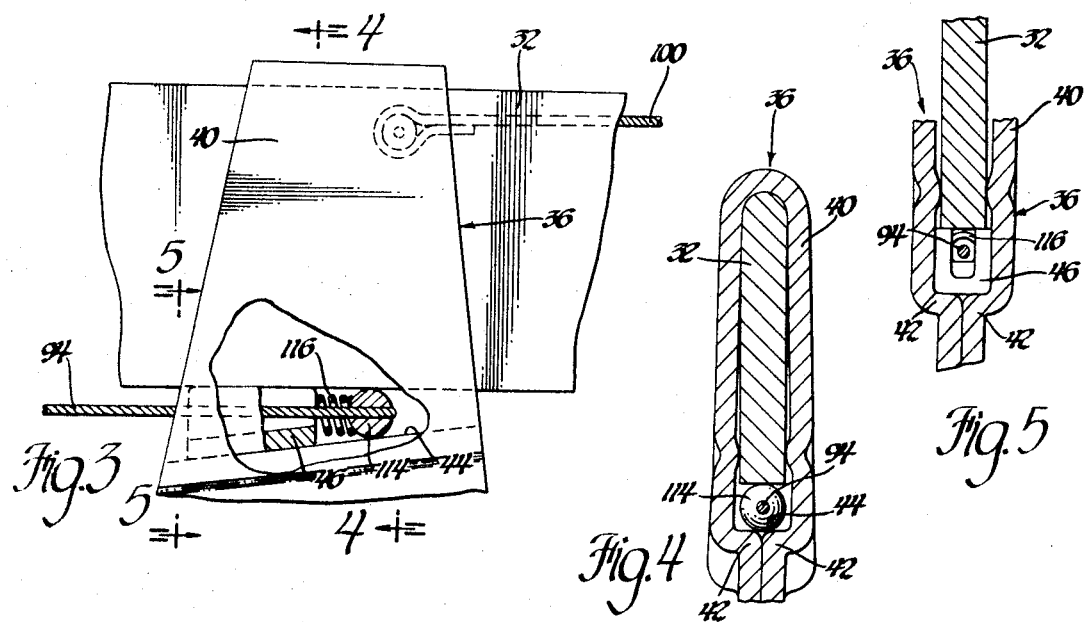
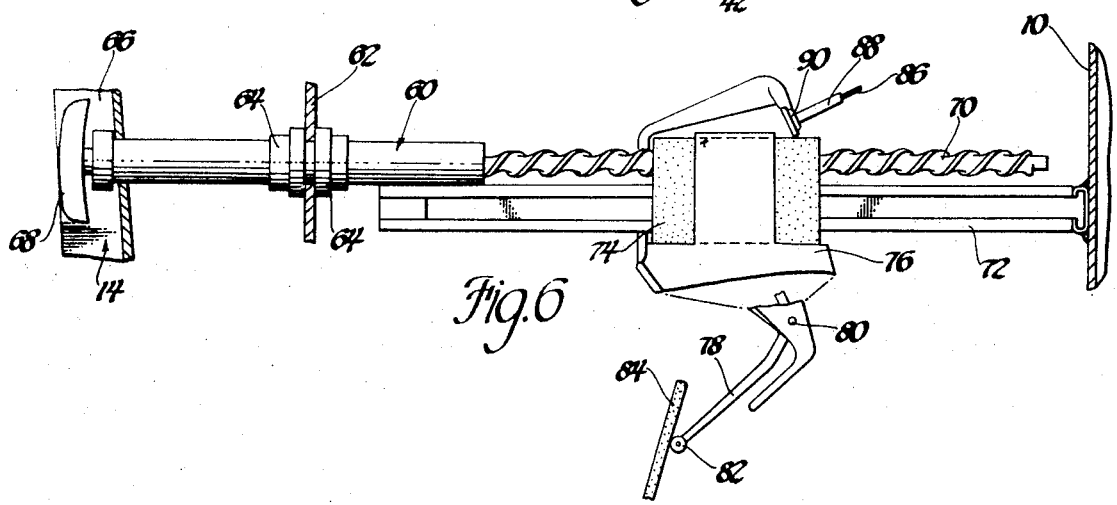
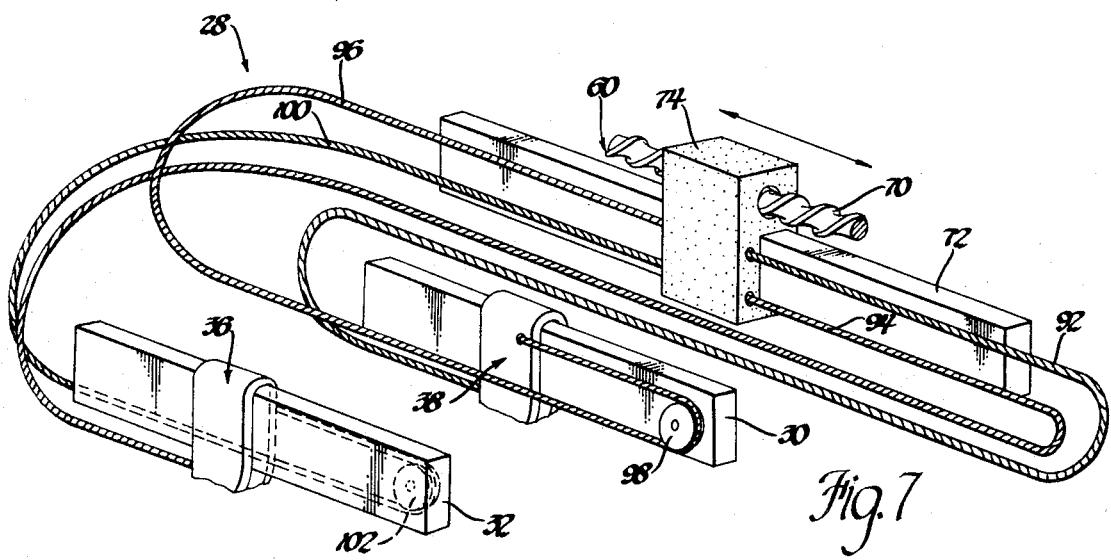

VEHICLE CONTROL APPARATUS

This invention relates generally to vehicle control apparatus and in particular to foot operated controls.

In vehicles such as automobiles, where it can be expected that many different persons will operate the vehicle, means must be provided to allow comfortable control of the vehicle by operators having different physical characteristics. This is particularly true of the foot operated controls normally present such as the brake control, the clutch control, and the accelerator control. Typically, these foot controls are nonadjustable and adjustment means are provided at the operator's seat, the seat being shiftable fore and aft to accommodate operators with shorter or longer legs. It has been suggested, however, that certain benefits will accrue if the operator's seat is rigidly and nonadjustably attached to the vehicle body and fore and aft adjustment is provided at the foot controls. Control apparatus according to this invention incorporates in a single system a new foot pedal structure particularly adapted for adjustment and a new synchronizing arrangement adapted to simply and efficiently synchronize adjusting movement of a plurality of such foot pedals.

Accordingly, the primary feature of this invention is that it provides a new and improved control apparatus for vehicles generally and particularly for automobile type vehicles. Another feature of this invention is that it provides a new and improved control apparatus including adjustable foot operated pedals which are physically easier to operate when adjusted for a small operator than when adjusted for a larger operator. Yet another feature of this invention is that it provides new and improved control apparatus including simplified synchronizing means which permit simultaneous adjustment of a plurality of foot operated controls. A further feature of this invention resides in the provision in the control apparatus of a foot operated pedal structure including a pivot bar supported on the body for pivotal movement about a fixed axis, a pedal support member mounted on the pivot bar for bodily movement therealong, and a pedal rigidly attached to the support member and defining a pressure application surface, the pressure application surface being oriented to direct a force applied thereto along a line oblique to the pivot bar so that bodily movement of the support member along the pivot bar alters the effective lever arm through which the applied force acts about the fixed axis. A still further feature of this invention resides in the provision in the control apparatus of a synchronizing arrangement for a plurality of pedal units as described hereinbefore, the synchronizing arrangement including an inextensible and flexible connector rigidly attached to each of the pedal support members and to an adjusting member mounted on the body for bodily shiftable movement so that such movement of the adjusting member effects simultaneous and synchronous bodily movement of each of the pedal support members along their respective pivot bars.

These and other features of this invention will be readily apparent from the following specification and from the drawings wherein:

FIG. 3 is an enlarged view of a portion of FIG. 1 showing the connection between the pivot bar and the pedal support member of the pedal structure;

FIG. 4 is a sectional view taken generally along the plane indicated by lines 4—4 in FIG. 3;

FIG. 5 is a sectional view taken generally along the plane indicated by lines 5—5 in FIG. 3;

FIG. 6 is a view of a portion of the control apparatus according to this invention showing the manually actuable operating means therefor; and FIG. 7 is a perspective schematic view of the control apparatus according to this invention.

Figure 1:
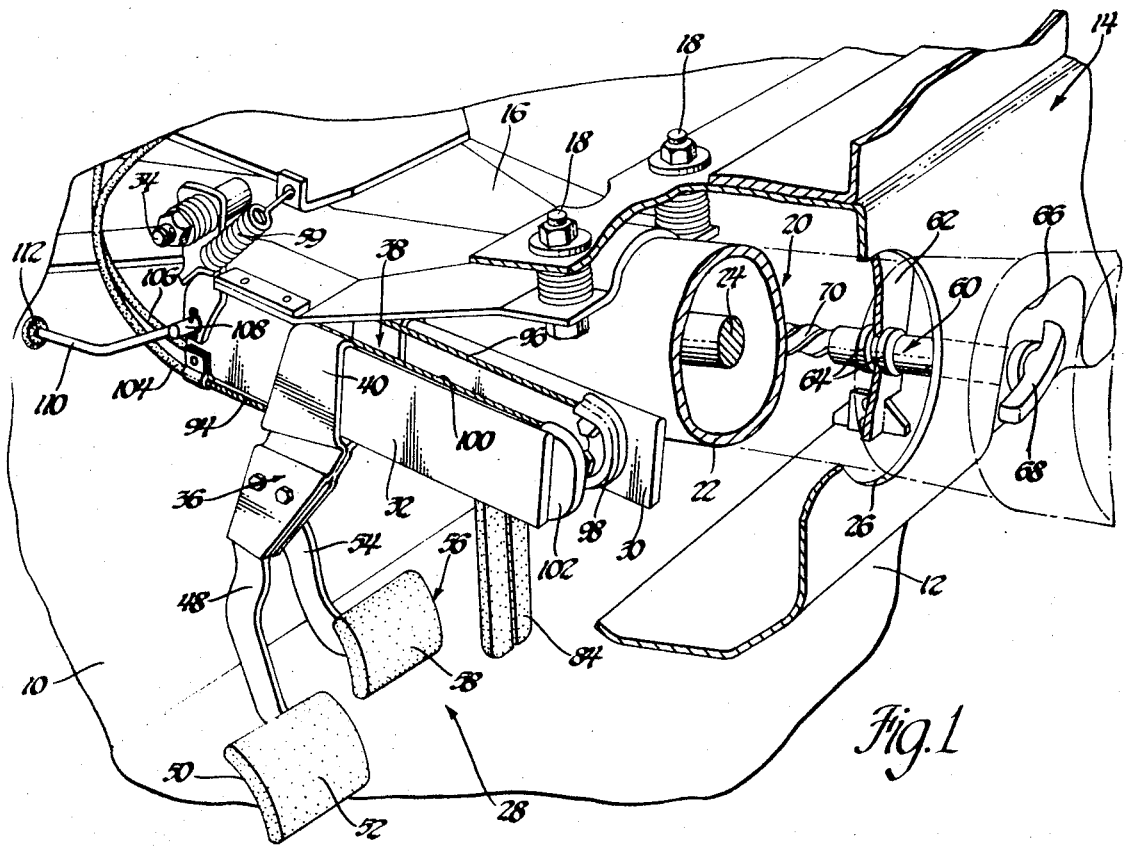
FIG. 1 is a fragmentary partially broken away perspective view of the forward portion of the passenger compartment of an automobile vehicle body showing a control apparatus according to this invention.

Referring now to FIG. 1 of the drawings, there shown in partially broken away perspective view is a portion of the forward section of the passenger compartment of an automobile type vehicle body, the forward extremity of the passenger compartment being defined by a generally vertically extending firewall 10 which merges at the lower margin thereof with a floor panel 12 defining the lower extremity of the passenger compartment. Disposed transversely across the passenger compartment rearwardly of the firewall 10 is an instrument panel structure 14 rigidly connected at its opposite ends to the vehicle body and rigidified intermediate its ends by a brace assembly 16 attached to the vehicle body by conventional means, not shown, and to the instrument panel structure 14 by a pair of bolts 18. A conventional steering column assembly 20, including a mast jacket 22 and a steering shaft 24, protrudes through an aperture 26 in the instrument panel structure 14 and through the firewall 10 to connect forwardly of the latter to the vehicle steering gear, not shown. Disposed generally forwardly of and below the instrument panel structure and on opposite sides of the steering column assembly 20 is a control apparatus according to this invention and designated generally 28.

The control apparatus according to this invention is particularly adapted to facilitate actuation of those automobile type vehicle controls normally actuated by the foot of the vehicle operator; namely, the clutch, the brake, and the accelerator. To this end, the control apparatus 28 includes a pair of generally flat elongated pivot bars 30 and 32 each supported on the brace assembly 16 for pivotal movement about a common pivot axis defined by a stud 34 rigidly attached to the brace assembly. A pedal support member 36 is disposed on the pivot bar 32 for bodily shiftable movement longitudinally of the latter and an identical pedal support member 38 is similarly disposed on the pivot bar 30.

Referring now to FIG. 3 and describing only pedal support member 36, the latter is fabricated from a flat sheet of stock which is folded generally in half to define an elongated loop formation 40 substantially the same width as the pivot bar 32 but having slightly more depth than the latter. As seen best in FIGS. 4 and 5, the loop portion is crimped closed at the lower margin thereof at 42. The crimps 42 define interiorly of the loop portion a generally flat surface 44 which, as seen best in FIG. 3, diverges from the lower margin of the pivot bar 32. A wedge-shaped clip 46 having a generally U-shaped cross section, FIG. 5, is rigidly attached to the pedal support member 36 within the wedge-shaped cavity defined between the lower margin of the pivot bar and the surface 44. The clip 46 cooperates with the upper margin of the loop portion of the pedal support member in mounting the latter on the pivot bar for longitudinal bodily shiftable movement.

Figure 2:
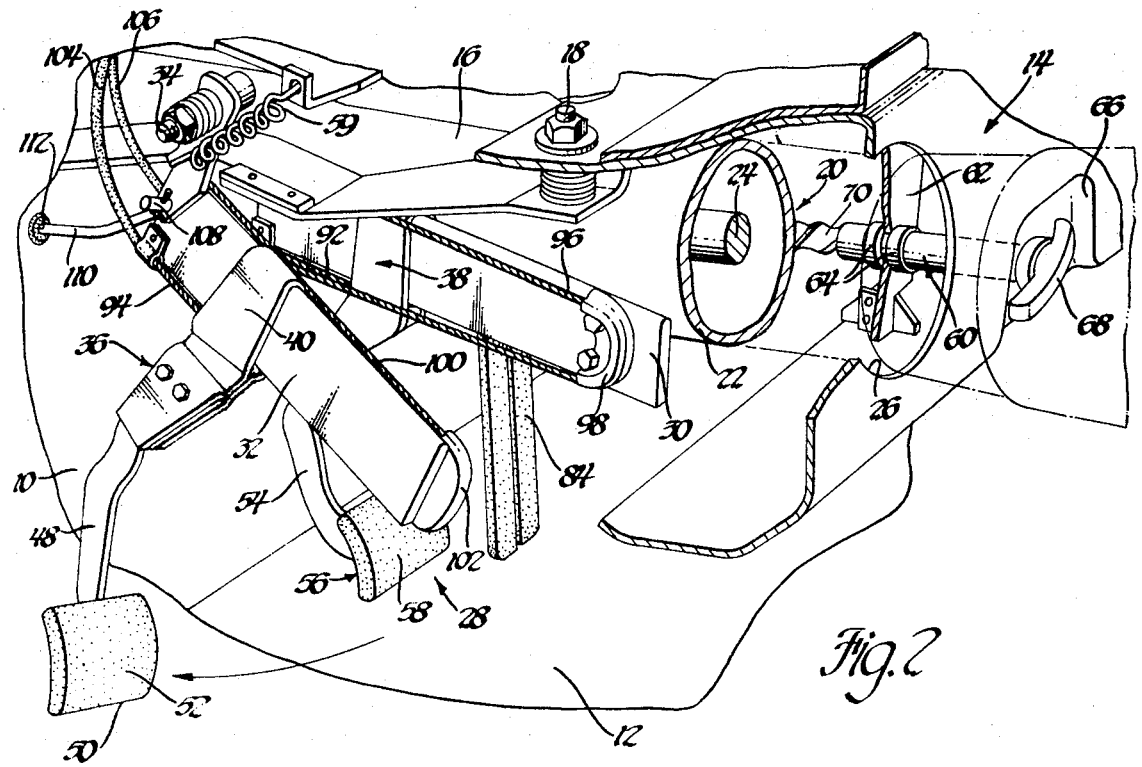
FIG. 2 is similar to FIG. 1 but showing a pedal structure portion of the control apparatus in an actuated position.

Rigidly attached to the lower end of the pedal support member 36 is an arm 48 having affixed to the distal end thereof a pedal 50 defining a pressure application surface 52. Similarly rigidly attached to the pedal support member 38 is a lever arm 54 having affixed to the distal end thereof a pedal 56 defining a pressure application surface 58. With reference to FIGS. 1 and 2, it will be appreciated that with the pedal support members 36 and 38 held stationary relative to the pivot bars 32 and 30, application of force on the pressure application surface of either pedal will affect pivotal movement of the corresponding pivot bar about the stud 34, as for example from the position of pivot bar 32 shown in FIG. 1 to the position thereof shown in FIG. 2. A helical tension spring 59 disposed between the frame assembly 16 and the pivot bar 32 biases the latter toward the position thereof shown in FIG. 1 corresponding to the unactuated condition of the particular vehicle control. A similar spring, not shown, is disposed for the same purpose between the frame assembly 16 and the pivot bar 30.

By bodily shifting the pedal support member 36 toward or away from the pivot stud 34 the effective lever arm about the stud through which a force applied on the pressure application surface 58 acts is varied thereby increasing or reducing the amount of force necessary to generate a predetermined amount of torque about the pivot stud. More particularly, as seen best in FIG. 1, the lever arm 48 positions the pedal 50 such that a force applied on the pressure application surface and perpendicularly thereto at any point therealong is directed along a line extending obliquely or in nonparallel relation to the pivot bar 32. Accordingly, as the pedal support member 36 is moved toward the distal end of the pivot bar 32, the lever arm through which such force acts about the pivot stud 34 increases and thereby permits forces on the pressure application surface of progressively smaller magnitude to generate a constant torque about the pivot stud 34. The same is true, of course, for the pedal 56 on the lever arm 54.

As seen best in FIGS. 1, 2 and 6, the control apparatus 28 further includes a shaft 60 rotatably journaled in a back panel portion 62 of the instrument panel structure 14 and restrained against axial bodily movement by a pair of retainers 64 disposed on opposite sides of the back panel portion. The outboard end of the shft 60 projects through the instrument panel structure 14 and into a recess 66 in the latter, a handle 68 rigidly attached to the end of the shaft 60 being disposed in the recess 66 and adapted for manual manipulation as described hereinafter. Generally from the midportion of the shaft 60 to the end thereof opposite the handle 68 the shaft has formed thereon a helical thread 70. As seen best in FIG. 6, a channel guide member 72 is rigidly attached to the firewall 10 and projects therefrom in generally parallel relation to and somewhat below the helical thread 70 on the shaft 60. The channel guide slidably supports a nut member 74 having a threaded bore therein adapted for reception of the helical thread 70 on the shaft 60. Accordingly, when the shaft 60 is rotated in either direction through the application of torque at the handle 68 the nut member 74 undergoes bodily shiftable movement along the channel guide 72 in a direction depending upon the direction of rotation of the shaft 60.

Referring now to FIG. 6, a support bracket 76 is rigidly attached to the nut member 74 for bodily shiftable movement as a unit therewith. The bracket 76 supports a generally V-shaped lever arm 78 for pivotal movement about an axis defined by a pivot pin 80. The lower end of the lever arm 78 has pivotally attached thereto at 82 an elongated, flat pedal pad 84 while the upper end of the lever arm 78 has attached thereto one end of a flexible but inextensible cable element 86. The cable element 86 is disposed within a sheath 88 rigidly attached at one end to the support bracket 76 at 90. Spring means, not shown, are provided between the lever arm 78 and the support bracket 76 resiliently urging clockwise rotation of the lever arm. Accordingly, a force applied on the exposed surface of the pedal pad 84 effects counterclockwise pivotal movement of the lever arm and leftward bodily shiftable movement of the cable element 86.

As seen best in FIG. 7, motion transmitting cable assemblies are disposed between the nut member 74 and each of the pedal support members 36 and 38. More particularly, a first cable element 92 attached to the nut member 74 extends therefrom toward the instrument panel structure and is attached to the pedal support member 38, the cable element approaching the pedal support member from the side thereof away from the instrument panel structure. A second cable element 94 is similarly disposed between the nut member 74 and the pedal support member 36. A third cable element 96 attached to the nut member 74 extends therefrom toward the firewall 10 and is attached to the pedal support member 38, the cable element being looped over a guide 98 on the pivot bar and approaching the pedal support member from the side thereof nearest the instrument panel structure. A fourth cable element 100 is similarly disposed between the nut member 74 and the pedal support member 36 and looped around a guide 102 on the pivot bar 32. As seen best in FIGS. 1 and 2, and as will be readily understood by those skilled in the art, the cable elements 92, 94, 96 and 100 are enclosed over a portion of their lengths in sheath elements, as at 104 and 106, which are rigidly anchored to respective ones of the pivot bars 30 and 32 and to the channel guide member 72 so that bodily shiftable movement of the nut member in either direction along the guide member 72 effects corresponding and equal bodily shiftable movement of each of the pedal support members 36 and 38 relative to respective ones of the pivot bars 30 and 32. Accordingly, by rotating the handle 68, simultaneous fore or aft bodily shiftable movement of the bracket 76 and the pedal support members 36 and 38 can be effected.

Typically, the control apparatus according to this invention would be installed in an automobile type vehicle with the pedal pad 84 adapted for control of the vehicle throttle, the pedal 56 adapted for control of the vehicle brake, and the pedal 50 adapted for control of the vehicle clutch. More particularly, the cable element 86, in an automobile installation, is connected to the throttle bell crank of the carburetor portion of the engine, not shown, disposed forwardly of the firewall 10. Further, as seen best in FIGS. 1 and 2, the pivot bar 32 has pivotally connected thereto at 108 one end of a push rod 110 which extends through an aperture 112 in the firewall 10 for connection through appropriate conventional linkage to the vehicle clutch actuating lever such that pivotal movement of the pivot bar 32 from the position thereof shown in FIG. 1 to the position thereof shown in FIG. 2 effects disengagement of the clutch. Similarly, the pivot bar 30 is connected through appropriate push rod means, not shown, to the vehicle brake mechanism such that clockwise pivotal movement of the pivot bar 30 about the stud 34 effects brake actuation.

During assembly of the control apparatus according to this invention, prior to attachment of the cable elements 92, 96, 94 and 100, the nut member 74 and the pedal support members 36 and 38 are aligned generally in a common transverse plane so that at any particular instant each of the pressure application surfaces 52 and 58 and the pedal pad 84 are substantially equally spaced from the operator's seat. The various cable elements are then connected between the nut member and the pedal support members as described hereinbefore. For comfortable manipulation by an operator having generally average physical characteristics, the pedal support members 36 and 38 would normally be located approximately midway between the ends of the pivot bars 32 and 30 while the nut member 74 would be disposed approximately midway between the ends of the channel guide member 72. If, subsequently, the vehicle is to be driven by a larger than average operator, that operator upon entering the vehicle would grasp the handle 68 and rotate the latter clockwise, FIGS. 1 and 2, to effect synchronous or simultaneous bodily shiftable movement of the pedal support members 36 and 38 toward the pivot stud 34 and of the nut member 74 toward the firewall 10. As described hereinbefore, such movement of the pedal support members decreases the lever arm about the pivot stud 34 through which forces applied on the pressure application surfaces 52 and 58 act thus requiring slightly more force on the pressure application surface to achieve actuation of the brake or the clutch. However, larger than average operators normally are somewhat stronger than operators of average stature so that the increased effort required is of little or no significance. Conversely, a smaller than average operator upon entering the vehicle would rotate the handle 68 in a counterclockwise direction to effect synchronous bodily shiftable movement of the pedal support members 36 and 38 away from the pivot stud 34 and of the nut member 74 toward the instrument panel structure, thus decreasing the distance between the operator's seat and the pressure application surfaces 52 and 58 and the pedal pad 84. As described hereinbefore, such movement increases the lever arm through which forces on the pedal application surfaces 52 and 58 act about the pivot stud 34 thus requiring less effort on the part of the operator to effect control of the clutch and the brake. This, of course, is most convenient for the smaller than average operator who typically possesses something less than average strength.

Referring now particularly to FIGS. 3, 4 and 5, there shown in detail is the connection between the cable element 94 and the pedal support member 36, the connection between cable 92 and pedal support member 38 being identical. This connection is adapted to prevent bodily shiftable movement of the pedal support member along the pivot bar under the influence of forces applied at the pedal application surface. Conversely, when the nut member remains stationary and a force is applied at surface 52, the sphere tightly wedges between the lower margin of the pivot bar and the surface 44 to prevent any substantial relative movement between the support member and the pivot bar. The cables between the pedal support members and the nut member also function to maintain the position of the latter relative to the firewall when adjustment is not desired. This, of course, is necessary because of the high lead of the thread on shaft 60. More particularly, in the wedge-shaped cavity defined by the lower margin of the pivot bar, the small end of the clip 46, and the flat surface 44 there is disposed a metal sphere 114 rigidly attached to the end of cable element 94. Disposed between the sphere and the small end of the clip 46 is a helical spring 116 which continuously urges the sphere 114 into wedging engagement between the lower margin of the pivot bar and the surface 44, FIG. 3. The cable 94 extends through the spring 116 and the interior portion of the V-shaped clip 46, FIG. 5. Accordingly, when the pedal support member 36 is shifted rightwardly by the cable element 100, FIG. 3, corresponding to bodily shiftable movement away from the pivot stud 34, the sphere 114 offers no resistance. Similarly, when the nut member 74 is shifted rearwardly by the thread 70, the cable 94 is placed in tension thus pulling the sphere 114 toward the clip 46 and out of engagement with the surface 44 so that bodily shiftable movement of the pedal support member 36 toward the pivot stud 34 can proceed.

Having thus described the invention, what is claimed is:

1. In a vehicle body, control pedal apparatus for effecting actuation of operating systems of said vehicle body comprising, in combination, a first pivot bar, a second pivot bar, means mounting each of said first and said second pivot bars on said vehicle body for pivotal movement about a common fixed axis of the latter between first positions corresponding to an unactuated condition of each of a pair of operating systems of said vehicle body and second positions corresponding to an actuated condition of each of said pair of operating systems, means operatively connecting said first pivot bar to one of said pair of operating systems, means operatively connecting said second pivot bar to the other of said pair of operating systems, a first pedal support member, a second pedal support member, means mounting each of said first and said second pedal support members on respective ones of said first and said second pivot bars for bodily shiftable movement relative thereto between a plurality of positions disposed at various finite distances from said fixed axis, first pedal means defining a pressure application surface, second pedal means defining a pressure application surface, means rigidly attaching each of said first and said second pedal means to respective ones of said first and said second pedal support members, an adjusting member, means mounting said adjusting member on said vehicle body for bodily shiftable movement relative to the latter, a first flexible and inextensible connecting member, a second flexible and inextensible connecting member, means rigidly attaching said first pedal support member to said first connecting member, means rigidly attaching said second pedal support member to said second connecting member, and means rigidly attaching each of said first and said second connecting members to said adjusting member so that bodily shiftable movement of the latter effects synchronous bodily shiftable movement of each of said first and said second pedal support members.

2. Control pedal apparatus as recited in claim 1 further including selectively operable control means associated with said adjusting member and adapted to effect bodily shiftable movement of the latter.

3. In a vehicle body, control pedal apparatus for effecting actuation of operating systems of said vehicle body comprising, in combination, a first pivot bar, a second pivot bar, means mounting each of said first and said second pivot bars on said vehicle body for pivotal movement about a common fixed axis of the latter between first positions corresponding to an unactuated condition of each of a pair of operating systems of said vehicle body and second positions corresponding to an actuated condition of each of said pair of operating systems, means operatively connecting said first pivot bar to one of said pair of operating systems, means operatively connecting said second pivot bar to the other of said pair of operating systems, a first pedal support member, a second pedal support member, means mounting each of said first and said second pedal support members on respective ones of said first and said second pivot bars for bodily shiftable movement relative thereto between a plurality of positions disposed at various finite distances from said fixed axis, first pedal means defining a pressure application surface, second pedal means defining a pressure application surface, means rigidly attaching each of said first and second pedal means to respective ones of said first and said second pedal support members, an adjusting member, means mounting said adjusting member on said vehicle body for bodily shiftable movement relative to the latter, a first flexible and inextensible connecting member, a second flexible and inextensible connecting member, means rigidly attaching said first pedal support member to said first connecting member, means rigidly attaching said second pedal support member to said second connecting member, means rigidly attaching each of said first and said second connecting members to said adjusting member so that bodily shiftable movement of the latter effects synchronous bodily shiftable movement of each of the said first and said second pedal support members, a support bracket, means rigidly attaching said support bracket to said adjusting member, a third pedal means pivotally supported on said support bracket, cable control means disposed between said third pedal means and a third operating system of said vehicle adapted to effect actuation of said third system in response to pivotal movement of said third pedal means, a threaded actuator rotatably supported on said vehicle body and threadedly received in said adjusting member so that rotation of said actuator effects bodily shiftable movement of said adjusting member and synchronous bodily shiftable movement of said first and said second pedal support members, and manually operable control means disposed on said actuator and adapted to effect selective rotation of said actuator.

* * * * *